(12) United States Patent
da Silva do Vale

(10) Patent No.: US 12,552,503 B2
(45) Date of Patent: Feb. 17, 2026

(54) HYBRID PRESSURE VESSEL

(71) Applicant: Oceaneering International, Inc., Houston, TX (US)

(72) Inventor: Vilmar da Silva do Vale, Sao Paulo (BR)

(73) Assignee: Oceaneering International, Inc., Houston, TX (US)

( * ) Notice: Subject to any disclaimer, the term of this patent is extended or adjusted under 35 U.S.C. 154(b) by 742 days.

(21) Appl. No.: 17/889,080

(22) Filed: Aug. 16, 2022

(65) Prior Publication Data

US 2023/0047808 A1 Feb. 16, 2023

Related U.S. Application Data

(60) Provisional application No. 63/233,414, filed on Aug. 16, 2021.

(51) Int. Cl.
*B63G 8/00* (2006.01)
*G01N 23/18* (2018.01)

(52) U.S. Cl.
CPC .............. *B63G 8/001* (2013.01); *G01N 23/18* (2013.01); *G01N 2223/628* (2013.01)

(58) Field of Classification Search
CPC .. B63G 8/001; G01N 23/18; G01N 2223/628; G01N 23/02; B63C 11/52
See application file for complete search history.

(56) References Cited

U.S. PATENT DOCUMENTS

2015/0373822 A1* 12/2015 Churchman .......... G01N 23/04
378/59

FOREIGN PATENT DOCUMENTS

DE 4417659 A1 * 11/1995 ....... B32B 17/10036
RU 2728888 C1 * 7/2020

* cited by examiner

*Primary Examiner* — Anthony D Wiest
(74) *Attorney, Agent, or Firm* — Maze IP Law, P.C.

(57) ABSTRACT

The disclosed invention comprises one or more hybrid metal-composite pressure vessels e.g., 1 (FIG. 1) or 100,200 (FIG. 2), designed for deep water application of radiation sensitive equipment, where the hybrid pressure vessels comprise a combination of metals and non-metals. A source of radiation may be disposed in one of the two hybrid metal-composite pressure vessels and a radiation detector disposes in the other hybrid metal-composite pressure vessel. A radiation beam is less attenuated as it passes through the non-metal parts of the hybrid pressure vessels and the intensity of the radiation reaching a radiation detector is higher than if it were to pass through the metal parts of the housings.

16 Claims, 2 Drawing Sheets

HYBRID PRESSURE VESSEL

RELATION TO OTHER APPLICATIONS

This application claims priority through U.S. Provisional Application 63/233,414 filed on Aug. 16, 2021.

BACKGROUND

The technology relates to underwater inspection, and, specifically, to deep-water applications using sources of ionizing radiation x-ray, gamma-ray, or neutrons. The technology is also used for inspecting subsea or floating assets, including but not limited to pipelines, risers, flexible pipes, insulated pipes, umbilicals, weldments, structures, valves, ship hull, and ship hull accessories.

For underwater radiography, a source of ionizing radiation (x-ray, gamma-ray, or neutrons) is typically housed in a pressure vessel. Pressure vessels which are used underwater or for deep-water application are generally made of metal, e.g., aluminum or steel. The metals have a very high radiation attenuation coefficient and, therefore, radiation is filtered by the metallic walls of the pressure vessel, resulting in capturing a low quality of radiographic image of the object such as a subsea pipeline, or riser along with requiring a lot of time for inspection of the object.

FIGURES

Various figures are included herein which illustrate aspects of embodiments of the disclosed inventions.

DESCRIPTION OF EXEMPLARY EMBODIMENTS

The disclosed invention comprises one or more hybrid metal-composite pressure vessels e.g., 1 (FIG. 1) or 100,200 (FIG. 2), which may be used for deep water application of radiation sensitive equipment. The hybrid pressure vessels comprise a combination of metals and non-metals which can provide sufficient strength to resist pressure under water and non-metal like carbon fiber reinforced plastic (CFRP) which can provide transparency to radiation. CFRP material typically has a radiation attenuation coefficient lower than that of metals like aluminum and steel, and a low radiation attenuation coefficient can provide significant advantages for deep-water radiology applications. Since a radiation beam is less attenuated as it passes through the CFRP parts of the hybrid pressure vessels, the intensity of the radiation reaching a radiation detector is higher than if it were to pass through the metal parts of the housings. A higher intensity of radiation can lead to a better signal-to-noise ratio and, consequently, a better quality the radiographic image. A higher intensity also allows for lower exposure times to form the images, thus reducing the overall inspection time.

Use of a non-metal like CFRP provides transparency to the radiation, i.e., the attenuation coefficient of the non-metals like CFRP is very low as compared to metals, resulting in capturing a better quality of radiographic image. The combination of metal and non-metals parts also provides strength to resist pressure under water. Further, non-metal parts such as those comprising CFRP can comprise a specific strength and stiffness that are higher than those of most metals. This allows for reduced thickness and, consequently, even lower total attenuation for a specific hybrid pressure vessel configuration. By appropriate selection of material, geometry and dimensions, the hybrid pressure vessel can withstand the pressure of subsea environment at depths of 3000 m or more.

Figure 1:
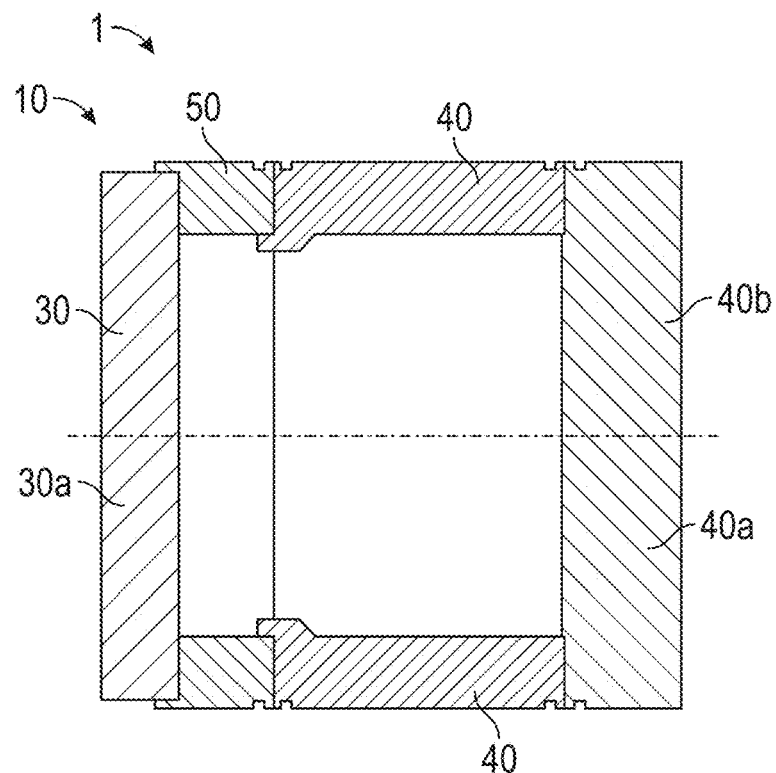
FIG. 1 is a schematic view in partial perspective of an exemplary hybrid metal-composite pressure vessel.

In a first embodiment, referring generally to FIG. 1, hybrid metal-composite pressure vessel 1 comprises enclosed housing 10 and occlusive interface 50. By appropriate selection of material, geometry and dimensions, hybrid metal-composite pressure vessel 1 can withstand external pressure of subsea environment at depths of 3000 m or more and allow pressure inside hybrid metal-composite pressure vessel 1 to be kept at or below one 1 ATM for equipment components disposed within housing 10 that are not pressure tolerant, while also providing advantages for transmission of ionizing radiation or other energy forms through the non-metal parts.

Housing 10 typically comprises first pressure resistant portion 40, comprising a metal and a density sufficient to provide pressure resistance to a first predetermined pressure level, and remaining portion 30, comprising a non-metal. In embodiments, housing 10 comprises a cylinder, first pressure resistant portion 40 comprises first cap 40a disposed at a first end of the cylinder, and remaining portion 30 comprises second cap 30a disposed distally from first cap 40a.

Where hybrid pressure vessel 1 comprises a cylinder with two flat caps 40a,40b, one cap may be made from metal and the other cap made from non-metal such as CFRP. However, use of non-metal may extend to the cylinder and/or both caps.

The metal components are made from, but are not limited to, titanium, steel, and aluminum. Non-metal components, e.g., 104, are made from, but not limited to, glass, polymers, and plastics reinforced with fibers like carbon, glass, and aramid.

The metal of first pressure resistant portion 40 may comprise titanium, steel, or aluminum, or the like, or a combination thereof. In embodiments, first pressure resistant portion 40 further comprises a predetermined set of perforations which may comprise a connector receiver, for control and communication, a lifting point, or the like, or a combination thereof.

Typically, the non-metal component is configured to provide a predetermined level of transparency to radiation in a predetermined bandwidth, the radiation comprising ionizing radiation, microwaves, infrared, radio frequency, magnetism, sound including infrasound and ultrasound, and/or light, and the like, or a combination thereof. The non-metal component may comprise glass, a polymer, a fiber reinforced plastic like carbon, glass, and aramid, a carbon fiber reinforced plastic (CFRP), or the like, or a combination thereof. If the non-metal comprises CFRP, the CFRP material may comprise a radiation attenuation coefficient lower than that of the metal material and a sufficiently low radiation attenuation coefficient to provide significant advantages for deep-water radiology applications since the radiation beam is less attenuated as it passes through the CFRP parts of hybrid pressure vessel 1, allowing the intensity of the radiation reaching the radiation detector to be higher than if it were to pass through metal parts of the housing 10.

Selection of materials for hybrid metal-composite pressure vessel 1 may be tailored according the advantages they can provide for a specific application like cost, machinability, easy of inspection, heat transfer, grounding of electronic equipment, and shielding for electromagnetic interference. By way of example, the parts made of metal, due to the properties of these materials, can deliver advantages to the pressure vessel manufacture and operation like cost, machinability, easy of inspection, heat transfer, grounding of electronic equipment, and shielding for electromagnetic interference.

First pressure resistant portion 40 is typically configured to maintain an internal pressure at or below a second predetermined pressure level.

In certain embodiments, remaining portion 30 comprises a plurality of non-metal parts 210,211 linked together with a fastener such as an adhesive or a bolt (not shown in the figures).

Interface 50 is typically disposed between first pressure resistant portion 40 and remaining portion 30 and may comprise an O-ring, a gasket, a sealant, a water tight seal, or the like, or a combination thereof.

In embodiments, hybrid metal-composite pressure vessel 1 (or its equivalent 100,200 (FIG. 2)) further comprises internal radiation component 210 (FIG. 2), internal non-radiation component 230 (FIG. 3), and radiation shield 220 (FIG. 2) disposed within housing 10 to shield internal non-radiation 230 component from radiation.

Figure 2:
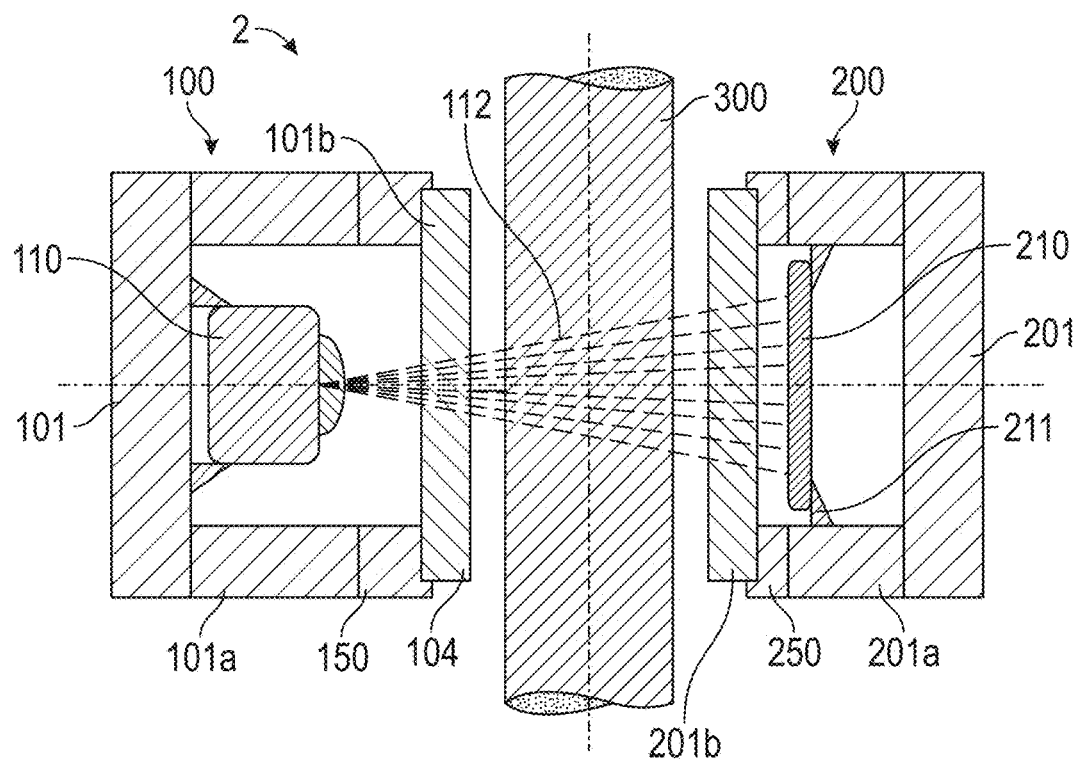
FIG. 2 is a schematic view in partial perspective of an exemplary hybrid metal-composite pressure vessel, one with a source of radiation and one with a radiation detector.

Referring now to FIG. 2, radiation system 2 comprises first hybrid metal-composite pressure vessel 100 designed for deep water application of radiation sensitive equipment, which is similar if not identical to hybrid metal-composite pressure vessel 1 described above, and typically comprises first enclosed housing 101, occlusive interface 150, source of radiation 110 disposed within the first enclosed housing 101 and comprising a radiation beam emitter, and second hybrid metal-composite pressure vessel 200, which is similar to first hybrid metal-composite pressure vessel 100.

As with hybrid metal-composite pressure vessel 1, first enclosed housing 101 comprises first pressure resistant portion 101a, which comprises a metal and a density sufficient to provide pressure resistance to a first predetermined pressure level, and remaining portion 101b, comprising a non-metal. First pressure resistant portion 101a is typically configured to maintain an internal pressure at or below a second predetermined pressure level. Typically, interface 150 is disposed between first pressure resistant portion 101a and remaining portion 101b and source of radiation 110 is disposed within first enclosed housing 101 with the radiation beam emitter exposed to remaining portion 101b.

Although second hybrid metal-composite pressure vessel 200 is similar to first hybrid metal-composite pressure vessel 100 and/or hybrid metal-composite pressure vessel 1 (FIG. 1) and also designed for deep water application of radiation sensitive equipment, it typically comprises second enclosed housing 201, occlusive interface 250, and radiation detector 210 disposed within second enclosed housing 201.

Second enclosed housing 201 comprises first pressure resistant portion 201a, comprising a metal and a density sufficient to provide pressure resistance to a first predetermined pressure level, and remaining portion 201b, comprising a non-metal. First pressure resistant portion 201a is typically configured to maintain an internal pressure at or below a second predetermined pressure level, e.g., a 1 ATM environment for equipment components that are not pressure tolerant, while providing advantages for the transmission of ionizing radiation or other energy forms through their non-metal parts.

Remaining portion 201b comprises a non-metal. Generally, the types of radiation or energies for which non-metals provide advantages include and are not limited to ionizing radiation, microwaves, infrared, radio frequency, magnetism, sound including infrasound and ultrasound, and light. The advantages for the application of specific radiation/energy sensitive equipment include and are not limited to increase or decrease of intensity, selection of frequency, and amplification.

Interface 250 is typically disposed between first pressure resistant portion 201a and remaining portion 201b.

Radiation detector 210, which is disposed within second enclosed housing 201, typically comprises a radiation beam detector exposed to remaining portion 201b.

In embodiments, source of radiation 110 comprises an ionizing radiation emitter ("IRE") and radiation detector 210 comprises an ionizing radiation detector ("IRD"). In these embodiments, the IRE may comprise an X-ray emitter and the IRD may comprise a flat panel digital detector array.

The dimensions of hybrid pressure vessels 100,200 are typically tailored to achieve a predetermined distance between IRE and IRD required by a specific application first hybrid pressure vessel 100 which contains the IRE, where the predetermined distance may further be configured to dislodge water in the path of a radiation beam emitted by the IRE.

When used for radiology applications, like digital radiography or computed tomography, the CFRP parts of the hybrid pressure vessels housing the IRE and IRD are chosen to be in the path of the ionizing radiation beam. The hybrid pressure vessel can provide additional advantage by reducing the amount of water in the path of the radiation beam. The water surrounding the hybrid pressure vessels and the object is a source of attenuation and scattering of the radiation beam. The attenuation and scattering have a detrimental impact on the quality of the radiographic image due to increased noise. Therefore, the less the water in the path of the radiation beam, the better the image quality.

Figure 4:
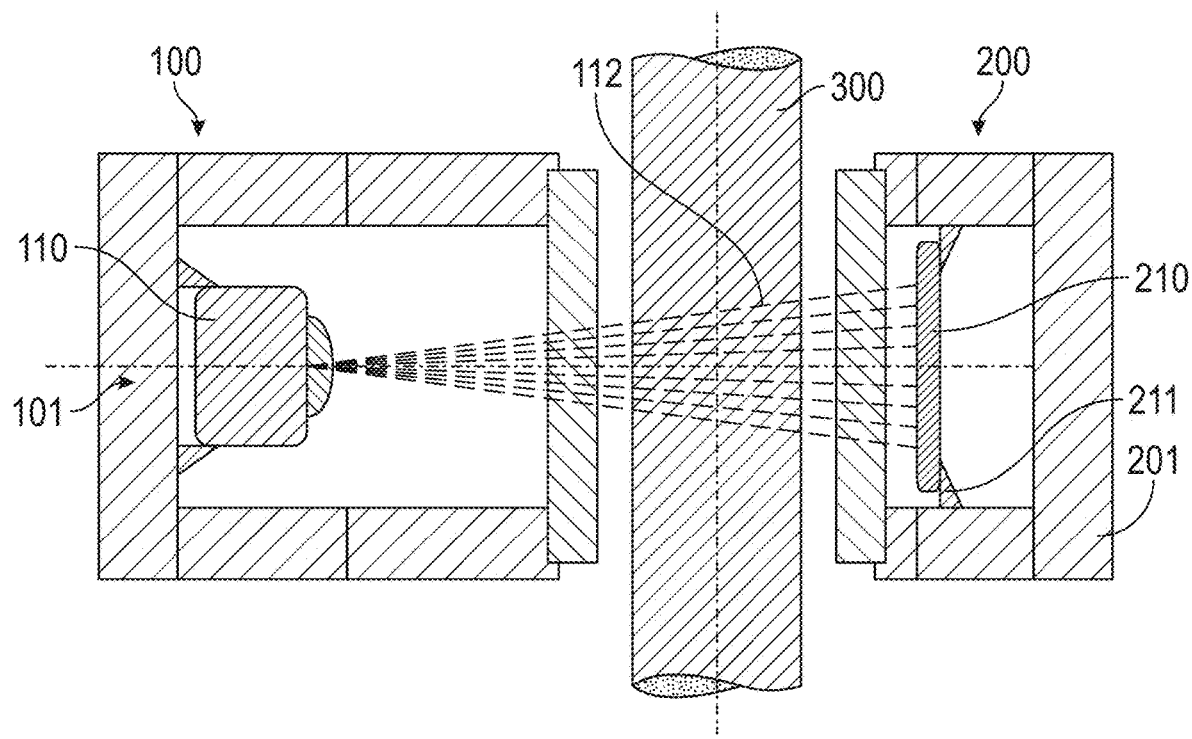
FIG. 4 is a schematic view in partial perspective of two exemplary hybrid metal-composite pressure vessels, one with an extended depth.

However, referring generally to FIG. 4, the specific application, according to the configuration of the object to be inspected, may require that the distance between the IRE and the IRD be increased and, consequently, the amount of water in the path of the radiation beam also increases. To counteract this otherwise unavoidable limitation of the application, the hybrid pressure vessel of the IRE can be used to dislodge the water in the path of the radiation beam. The dimensions of the hybrid pressure vessel may be tailored to the distance between IRE and IRD required by the specific application, as shown in FIG. 4.

In the various embodiments, linkage between non-metal, e.g., CFRP, parts may be accomplished by a fastener such as but not limited to adhesive or bolts to ensure adequate transfer of external loads. Further, an interface between the non-metal and metal parts may be made water-tight by sealing with O-rings, gaskets, or sealants. Further, the interface between metal parts is sealed hermetically with O-rings or gaskets to make the hybrid pressure water-tight while allowing for assembling and disassembling of the vessel as necessary, for inspection and maintenance operations.

In general, CFRP has an X-ray mass attenuation coefficient lower than that of metals like aluminum and steel. Low X-ray mass attenuation coefficient provides significant advantages for deep-water radiology applications. Since the radiation beam is less attenuated as it passes through the CFRP parts of the hybrid pressure vessels containing the IRE and the IRD, the intensity of the radiation reaching the IRD is higher than if it were to pass through the metal parts of the housings. The higher the intensity of the radiation the better the signal to noise ratio and, consequently, the quality of the radiographic image. A high intensity also allows for lower exposure times to form the images, thus reducing the overall inspection time. In addition, use of non-metals such as CFRP can be advantageous as CFRP specific strength and stiffness are higher than those of most metals. This allows for reduced thickness and, consequently, even lower total attenuation for a specific hybrid pressure vessel configuration. By appropriate selection of material, geometry and dimensions, the hybrid pressure vessel can withstand the pressure of subsea environment at depths of 3000 m or more.

Figure 3:
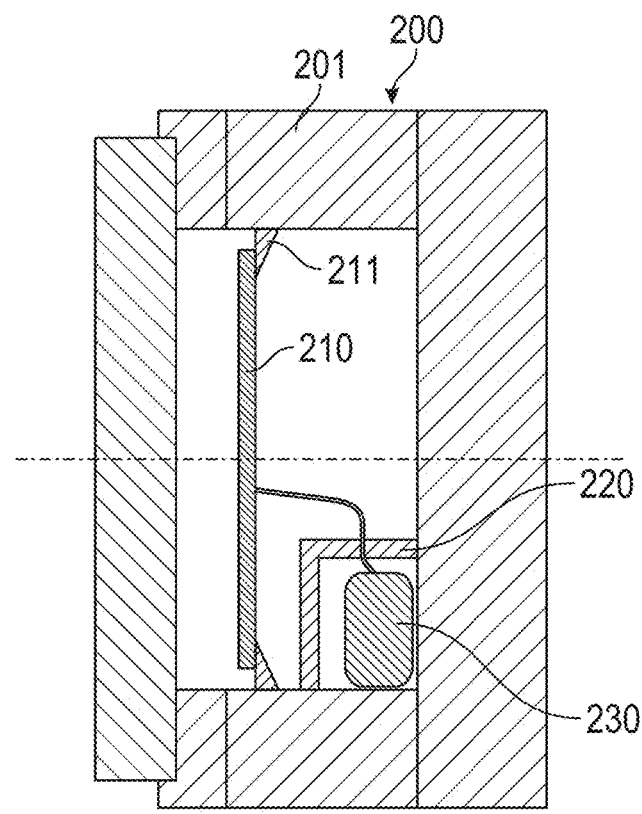
FIG. 3 is a schematic view in partial perspective of a further exemplary hybrid metal-composite pressure vessel with a radiation detector.

Moreover, pressure inside the hybrid pressure vessel 1 is typically maintained at or below 1 ATM, which means that equipment inside it may be kept in off the shelf condition, i.e., none of their components need to be replaced by pressure resistant ones. The arrangement of components may also be kept off the shelf or be re-arranged in a more appropriate way to reduce the dimensions of the housings, improve connectivity with other subsea or topside equipment, as well as to comply with other requirements of system, like keeping the operational temperature within limits, and shielding of electronic components that can be damaged due to the accumulated dose of radiation, as shown in FIG. 3.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A hybrid metal-composite pressure vessel, comprising:
   a. an enclosed housing, comprising:
      i. a first pressure resistant portion of the enclosed housing comprising a metal and a density sufficient to provide pressure resistance to a first predetermined pressure level, the first pressure resistant portion of the enclosed housing configured to maintain an internal pressure at or below a second predetermined pressure level; and
      ii. a remaining portion of the enclosed housing comprising a non-metal configured to provide a predetermined level of transparency to radiation in a predetermined bandwidth;
   b. an occlusive interface disposed between the first pressure resistant portion and the remaining portion; and
   c. an internal radiation component disposed within the housing and oriented to either emit or detect radiation through the occlusive interface.

2. The hybrid metal-composite pressure vessel of claim 1, wherein the metal comprises titanium, steel, or aluminum.

3. The hybrid metal-composite pressure vessel of claim 1, wherein the housing comprises a cylinder, the first pressure resistant portion comprises a first cap disposed at a first end of the cylinder, and the remaining portion comprises a second cap disposed distally from the first cap.

4. The hybrid metal-composite pressure vessel of claim 1, wherein:
   a. the radiation comprises ionizing radiation, microwaves, infrared, radio frequency, magnetism, sound, or light; and
   b. the non-metal comprises glass, a polymer, a fiber reinforced plastic.

5. The hybrid metal-composite pressure vessel of claim 4, wherein:
   a. the fiber reinforced plastic comprises a carbon fiber reinforced plastic (CFRP); and
   b. the CFRP material comprises a radiation attenuation coefficient lower than that of the metal and a sufficiently low radiation attenuation coefficient sufficient to provide a predetermined set of advantages for deepwater radiology applications since the radiation beam is less attenuated as it passes through the CFRP parts of the hybrid pressure vessels, where the intensity of the radiation reaching a radiation detector is higher than if it were to pass through the metal parts of the housings.

6. The hybrid metal-composite pressure vessel of claim 1, wherein:
   a. by appropriate selection of material, geometry and dimensions, the hybrid pressure vessel can withstand external pressure of subsea environment at depths of 300 0m or more; and
   b. pressure inside the hybrid pressure vessel is kept at or below one (1) ATM.

7. The hybrid metal-composite pressure vessel of claim 1, wherein the occlusive interface comprises an O-ring, a gasket, a sealant, or a water tight seal.

8. The hybrid metal-composite pressure vessel of claim 1, wherein the hybrid pressure vessel provides a 1 ATM environment.

9. The hybrid metal-composite pressure vessel of claim 1, further comprising:
   a. an internal non-radiation component; and
   b. a radiation shield disposed within the housing to shield the internal non-radiation component from radiation.

10. The hybrid metal-composite pressure vessel of claim 1, wherein the internal radiation component comprises:
    a. a source of radiation comprising a radiation beam emitter exposed to the occlusive interface; or
    b. a radiation detector comprising a radiation beam detector exposed to the occlusive interface.

11. The hybrid metal-composite pressure vessel of claim 1, wherein the first pressure resistant portion further comprises a predetermined set of perforations.

12. The hybrid metal-composite pressure vessel of claim 11, wherein the predetermined set of perforations comprises:
    a. a connector receiver for control and communication; and
    b. a lifting point.

13. A radiation system, comprising:
    a. a first hybrid metal-composite pressure vessel designed for deep water application of radiation sensitive equipment, comprising:
       i. a first enclosed housing, comprising:
          1. a first pressure resistant portion of the first enclosed housing comprising a metal and a density sufficient to provide pressure resistance to a first predetermined pressure level, the first pressure resistant portion of the first enclosed housing configured to maintain an internal pressure at or below a second predetermined pressure level;
          2. a remaining portion of the first enclosed housing comprising a non-metal configured to provide a predetermined level of transparency to radiation in a predetermined bandwidth;
          3. an occlusive interface disposed between the first pressure resistant portion and the remaining portion; and ii. a source of radiation disposed within the first enclosed housing comprising a radiation beam emitter exposed to the remaining portion; and b. a second hybrid metal-composite pressure vessel designed for deep water application of radiation sensitive equipment, comprising:
  i. a second enclosed housing, comprising:
    1. a first pressure resistant portion of the second enclosed housing comprising a metal and a density sufficient to provide pressure resistance to a first predetermined pressure level, the first pressure resistant portion of the enclosed housing configured to maintain an internal pressure at or below a second predetermined pressure level;
    2. a remaining portion of the second enclosed housing comprising a non-metal configured to provide a predetermined level of transparency to radiation in the predetermined bandwidth;
    3. an occlusive interface disposed between the first pressure resistant portion and the remaining portion; and
  ii. a radiation detector disposed within the second enclosed housing, the radiation detector comprising a radiation beam detector exposed to the remaining portion.

14. The radiation system of claim 13, wherein:
  a. the source of radiation comprises an ionizing radiation emitter (IRE);
  b. the radiation detector comprises an ionizing radiation detector (IRD); and
  C. a radiation shield disposed within the second enclosed housing.

15. The radiation system of claim 14, wherein:
  a. the IRE comprises an X-ray emitter; and
  b. the IRD comprises a flat panel digital detector array.

16. The radiation system of claim 14, wherein the dimensions of the hybrid pressure vessels are tailored to achieve a predetermined distance between IRE and IRD required by a specific application the hybrid pressure vessel of the IRE.

* * * * *